(12) United States Patent
Swearingen et al.

(10) Patent No.: US 6,982,100 B2
(45) Date of Patent: *Jan. 3, 2006

(54) METHOD FOR CHEESE MANUFACTURE

(75) Inventors: Margaret A. Swearingen, Shoreview, MN (US); Craig J. Schroeder, Lino Lakes, MN (US)

(73) Assignee: Land O'Lakes, Inc., Arden Hills, MN (US)

(*) Notice: Subject to any disclaimer, the term of this patent is extended or adjusted under 35 U.S.C. 154(b) by 66 days.

This patent is subject to a terminal disclaimer.

(21) Appl. No.: 10/210,956

(22) Filed: Aug. 2, 2002

(65) Prior Publication Data

US 2004/0022919 A1 Feb. 5, 2004

(51) Int. Cl.
A23C 9/12 (2006.01)

(52) U.S. Cl. .............................. 426/36; 426/38; 426/39; 426/40; 426/519; 426/582

(58) Field of Classification Search ................. 426/34, 426/36, 38, 39, 40, 519, 580, 582
See application file for complete search history.

(56) References Cited

U.S. PATENT DOCUMENTS

| | | | |
|---|---|---|---|
| 2,701,202 A | 2/1955 | Silberman | 99/116 |
| 2,701,204 A | 2/1955 | Strezynski | 99/116 |
| 3,079,263 A | 2/1963 | Foster et al. | 99/116 |
| 3,172,767 A | 3/1965 | Foster et al. | 99/116 |
| 3,406,076 A | 10/1968 | Little | 99/116 |
| 3,482,997 A | 12/1969 | Murray et al. | 99/116 |
| 3,507,750 A | 4/1970 | Murray et al. | 195/66 |
| 3,697,293 A | 10/1972 | Breidenstein | 99/116 |
| 3,698,918 A | 10/1972 | Goujard | 99/116 |
| 3,845,226 A | 10/1974 | Goujard | 426/239 |
| 3,882,250 A | 5/1975 | Loter et al. | 426/39 |
| 3,953,610 A | 4/1976 | Little | 426/39 |
| 4,053,643 A | 10/1977 | Corbin, Jr. | 426/40 |
| 4,066,791 A | 1/1978 | Corbin, Jr. | 426/39 |
| 4,199,609 A | 4/1980 | Metz | 426/582 |
| 4,389,425 A * | 6/1983 | Burr, II | 426/598 |
| 4,444,800 A | 4/1984 | Bixby et al. | 426/582 |
| 4,459,313 A | 7/1984 | Swanson et al. | 426/39 |
| 4,499,109 A | 2/1985 | Christiansen et al. | 426/36 |
| 4,689,234 A | 8/1987 | Ernstrom et al. | 426/38 |
| 4,713,254 A | 12/1987 | Childs et al. | 426/582 |
| 4,734,287 A | 3/1988 | Singer et al. | 426/41 |
| 4,959,229 A | 9/1990 | Reddy et al. | 426/39 |
| 4,980,179 A | 12/1990 | Koenraads et al. | 426/36 |
| 5,061,503 A | 10/1991 | Kong-Chan et al. | 426/582 |
| 5,063,074 A | 11/1991 | Kahn et al. | 426/585 |
| 5,130,148 A | 7/1992 | Brown et al. | 426/36 |
| 5,175,015 A | 12/1992 | Kahn et al. | 426/585 |
| 5,447,731 A | 9/1995 | Pedersen et al. | 426/36 |
| 5,470,593 A | 11/1995 | Meilinger et al. | 426/36 |
| 5,472,718 A | 12/1995 | Ijsseldijk et al. | 426/38 |
| 5,532,018 A | 7/1996 | Miller et al. | 426/582 |
| 5,709,900 A | 1/1998 | Miller et al. | 426/582 |
| RE35,728 E | 2/1998 | Bixby et al. | 426/582 |
| 5,766,330 A | 6/1998 | Knights et al. | 106/124.2 |
| 5,895,671 A | 4/1999 | Adamany et al. | 426/36 |
| 5,942,263 A | 8/1999 | Chen et al. | 426/38 |
| 6,060,093 A | 5/2000 | Davis et al. | 426/74 |
| 6,096,870 A | 8/2000 | Mozaffar et al. | 530/366 |
| 6,110,509 A | 8/2000 | Nauth et al. | 426/41 |
| 6,139,901 A | 10/2000 | Blazey et al. | 426/656 |
| 6,183,805 B1 | 2/2001 | Moran et al. | 426/582 |
| 6,214,404 B1 | 4/2001 | Han et al. | 426/582 |
| 6,224,914 B1 | 5/2001 | Han et al. | 426/36 |
| RE37,264 E | 7/2001 | Chen et al. | 426/38 |
| 6,258,389 B1 | 7/2001 | Adamany et al. | 426/34 |
| 6,299,914 B1 | 10/2001 | Christiansen et al. | 426/74 |
| 6,322,841 B1 | 11/2001 | Jackson et al. | 426/582 |

FOREIGN PATENT DOCUMENTS

WO   WO 02/089592 A1   11/2002

* cited by examiner

*Primary Examiner*—Leslie Wong
(74) *Attorney, Agent, or Firm*—Westman, Champlin & Kelly, P.A.

(57) ABSTRACT

A method for increasing the yield and quality in the manufacture of cheese from a selected volume of milk in which the volume of milk has been fortified with additional dairy components that increase the solids and includes pre-acidification of the fortified milk prior to cheese making. The fortified milk is subjected to an acid or acid producing material that quickly lowers the pH either before or after pasteurization to a pH of approximately 6.6 to 5.70. The acidification is performed under turbulent conditions to maintain milk protein native integrity. The acidified fortified milk is then subjected to the conventional cheese making process. The cheese made using the present invention is particularly useful in the subsequent manufacture of process cheese.

19 Claims, No Drawings

METHOD FOR CHEESE MANUFACTURE

BACKGROUND OF THE INVENTION

The present invention relates to a process for increasing cheese yield and improving cheese quality through the addition of condensed milk solids to whole milk followed by conditioning this blend using an acid or an acid producing material prior to cheese making.

The fortification of cheese milk with dairy solids (ultra-filtered milk, milk protein concentrate, non-fat dry milk, skim, part skim or whole milk condensed) has been utilized for many years to improve plant throughput thus improving plant efficiency. It has conventionally been thought that this type of fortification can also lead to improved cheese yield.

Acidification of milk prior to cheesemaking has been well documented. For example, Reddy et al. (U.S. Pat. No. 4,959,229) discusses acidification of milk after pasteurization in conjunction with elevated pasteurization temperatures of 185° F. for 16 seconds as having a significant effect on increasing whey protein retention. Acidification of cheese milk was between pH 5.7 and 6.4.

The Brown el al. (U.S. Pat. No. 5,130,148) also discusses acidification as a method to avoid an acid coagulum that is weak and prone to shattering.

The Ernstrom et al. (U.S. Pat. No. 4,689,234) discusses the use of acidification as a method to facilitate calcium removal during ultra-filtration and dia-filtration steps when milk is acidified to a pH range of 5.6–6.2. Milk is concentrated until the ultra-filtered retentate comprises 15–30% of the original weight then acidified by an acid or acid producing material to a pH of about 4.9–5.6. Following fermentation a coagulant is added for curd development.

The Foster et al. (U.S. Pat. No. 3,172,767) discusses adjusting downwardly the pH of whole milk indicating an improvement in the curd and clarity of the whey as the acidity of the milk was increased. Milk is acidified using a food grade acid to not lower than pH 4.6. The milk is then pasteurized and coagulated at 85–180° F.

BRIEF SUMMARY OF THE INVENTION

The present invention includes a method for increasing the yield and quality in the manufacture of cheese from a selected volume of milk. Whole milk is fortified with additional dairy component(s) that increase the solids to a predetermined level for the type of cheese manufactured. This blend of milk and concentrated milk is subjected to an acid or acid producing material that quickly lowers the pH either before or after pasteurization to a pH of approximately 6.6 to 5.70. Milk acidification is performed under turbulent conditions to maintain the integrity of native proteins in the milk. Lactic acid producing starter cultures are inoculated into the milk and ripening time follows. A coagulant is added to the vat and a coagulum is formed from the acidified fortified milk. The coagulum is then cut, stirred and cooked. As this occurs, curds and whey are formed in the vat. The whey is drained from the curd and the curd is processed to form cheese.

DETAILED DESCRIPTION

Milk fortification to increase yield in cheese making processes and plant through-put has been in use in the dairy industry for quite some time. Fortification includes the addition of a dairy component that provides additional solids to the cheese making process. Such dairy components include but are not limited to ultra-filtered milk, milk protein concentrate, non-fat dry milk, condensed skim, part skim or whole milk or any combination thereof.

By putting additional milk solids into a vat the number of resulting pounds of cheese solids out of the vat will increase, which will be defined as throughput. In plants that utilize vats to make cheese, fortification of milk to increase throughput is especially important. This throughput increase however, does not necessarily improve yield. By definition, yield is the amount of cheese (generally in pounds) produced from a set volume of milk (generally per 100 pounds of whole milk equivalents). Therefore, increasing yield, along with throughput is of particular interest because the vat becomes most efficient.

For example, 50,000 pounds of non-fortified milk (estimated at 12.8% total solids) in a vat is expected to give approximately a 10% yield (i.e. 10 pounds cheese/100 pounds milk or 5,000 pounds of cheese). Taking 50,000 pounds of milk fortified with ultra-filtered milk to 15% total solids will generate an estimated 13 pounds of cheese per 100 pounds fortified milk or 6655 pounds of cheese. However, to correctly assess the yield it is important to express this concentrated milk in whole milk equivalents to truly identify yield. To determine whole milk equivalent, an assessment of the amount of milk required to produce a 15% total solids cheese milk must be determined, which in the above specific example would be 66,500 pounds of non-fortified whole milk.

It has been found that increasing solids content by the addition of a dairy component does not result in the expected (by calculation) cheese yield. This discovery is contrary to traditional notion that increasing the solids content of a vat of milk increases the yield. Although additional milk solids are added, not all of those solids are captured during cheese making. In fact, the yield will be approximately 0.20–0.30% less than expected on a whole milk equivalency basis.

As part of this discovery and invention, it has been found that slight acidification of fortified milk results in the capture of the solids previously not retained in the curd as a result of fortification. Such acidification may be accomplished through the use of citric acid, an acidulant or any other organic, inorganic or acid producing bacteria. Slight acidification is defined as decreasing the pH to 6.6 to 6.0, but a reduction to approximately pH 5.70 is also effective. Preferably, a 10% citric acid solution is used.

Acidification of the milk should be done quickly. By quickly, it is meant acidification by an acidulent such as an acid is preferred over an acid producing bacterium.

During acidification integrity of native proteins of the milk should be maintained. Localized reduction of pH to the isoelectric point (pH 4.6 and below) should be avoided so as not to denature the native proteins. Turbulent conditions maintain milk protein native integrity by preventing any area of the milk to fall below the isoelectric point of milk (pH 4.6). Acidification may be accomplished using a metering pump, or an in-line injector in association with an in-line static mixer. Injecting acidulants at an elbow or "T" connection has also been found to provide sufficient turbulence. Milk may also be acidified in the blending tank under turbulent conditions. The temperature for acidification may vary greatly starting from just above freezing to 100° F.

The blend of whole and concentrated milk is subjected to an acid or acid producing material that quickly lowers the pH either before or after pasteurization to a pH range of approximately 5.70 to 6.00. Pasteurization is conducted under typical conditions required for legal pasteurization.

For example, 163° F. for 16 seconds is one preferred time/temperature regime resulting in adequate pasteurization.

After pasteurization, the milk temperature is reduced to approximately 85–95° F., and the acidified, fortified milk is transferred to the cheese vat. Calcium chloride ($CaCl_2$) may also be added at levels governed by U.S. government regulations to firm the resulting curd. Lactic acid producing starter cultures are inoculated into the milk and ripening time follows. A coagulant is added to the vat and a coagulum is formed from the acidified fortified milk. The coagulum is then cut, stirred and cooked. As this occurs curds and whey are formed in the vat. The whey is drained from the curd. The curd is salted and pressed into blocks or barrels. The curd can be used immediately or can be aged or cured.

The following examples are set forth for purposes of illustration only and are not to be construed as limitations on the invention.

EXAMPLE 1

The results of a four vat run are listed in Table 1 below for comparison purposes. One vat run started with whole milk and no ultra filtered milk solids (no fortification). Another vat included ultra filtered milk solids added to milk to a finished total solids of 14%. Two vats were run with the addition of ultra filtered milk solids amounting to 14% of the vat solids in milk and were pre-acidified to 6.3 and 6.1 pH. In all cases the starting pH of the milk was approximately 6.6 to 6.65 pH. As Table 1 below shows, the yield for the vat run with fortification and no pre-acidification (14% additional ultra filtered milk solids to vat solids) was less than the vat run using whole milk with no fortification and much less than the vat runs with fortification and pre-acidification.

TABLE 1

| Vat Run | Fortification with Ultra filtered milk solids to vat solids | Pre-Acidification | Yield as a Percentage (pounds cheese produced per 100 pounds milk or whole milk equivalents**) | Total Calcium* (mg/ 100 gm cheese) |
|---|---|---|---|---|
| 1 | 14% | No pre-acidification | 10.36 | 799 |
| 2 | Whole milk no UF milk solids | No pre-acidification | 10.58 | 752 |
| 3 | 14% | pH 6.3 | 10.62 | 672 |
| 4 | 14% | pH 6.1 | 10.64 | 568 |

*Calcium by Atomic absorption
**Milk equivalents determined on a protein basis

EXAMPLE 2

The results of four additional comparative vat runs similar to the vat runs of Example 1, except that the fortification was increased to 15% total solids in the milk of ultra filtered milk solids to vat. The results are listed in Table 2 below. Again, a fortified milk vat run of 15% total solids milk was prepared with no pre-acidification. The fortified milk with no pre-acidification produced a yield much less than the vat run with whole milk with no fortification. The two vat runs with fortification to 15% total solids in milk with ultra filtered milk solids produced a yield much greater than the vat run with fortification but without pre-acidification.

TABLE 2

| Vat Runs | Fortification with Ultra filtered milk solid to vat solids | Pre-Acidification | Yield as a percentage (pounds cheese produced per 100 pounds milk or whole milk equivalents**) | Total Calcium* (mg/ 100 gm cheese) |
|---|---|---|---|---|
| 1 | 15% | No pre-acidification | 10.32 | 795 |
| 2 | Whole milk no UF milk solids | No pre-acidification | 10.75 | 680 |
| 3 | 15% | pH 6.3 | 10.92 | 749 |
| 4 | 15% | pH 6.1 | 10.52 | 594 |

*Calcium by Atomic absorption
**Milk equivalents determined on a protein basis

The present invention is useful for all types of cheeses including those derived from a combination of components. The process of the present invention has been found to be particularly useful in the manufacture of cheese used as an ingredient in the manufacture of process cheese.

Although the present invention has been described with reference to preferred embodiments, workers skilled in the art will recognize that changes may be made in form and detail without departing from the spirit and scope of the invention.

What is claimed is:

1. A method for increasing yield in the manufacture of cheese from a selected volume of milk, the method comprising:
   starting with a milk having been fortified with a dairy component that provides additional solids for the making of cheese;
   acidifying the fortified milk down to a pH range of approximately 6.60 to 5.75 under turbulent conditions;
   forming a coagulum from the acidified fortified milk;
   cutting the coagulum to separate curd and whey;
   draining the whey from the curd; and
   processing the curd to form cheese.

2. The method of claim 1 and further comprising pasteurizing the fortified milk and wherein the fortified milk is acidified after pasteurization.

3. The method of claim 1 and further comprising pasteurizing the fortified milk and wherein the fortified milk is acidified before pasteurization.

4. The method of claim 1 wherein the fortified milk is acidified in-line in a region of turbulent flow.

5. The method of claim 4 wherein the turbulent flow occurs at a "T" connection.

6. The method of claim 4 wherein the turbulent flow occurs at an elbow.

7. The method of claim 1 wherein the fortified milk is acidified to a pH range of approximately 6.5 to 6.1.

8. The method of claim 1 wherein the fortified milk is heat-treated.

9. The method of claim 1 wherein the fortified milk is acidified with an organic or inorganic acid or acid producing bacteria.

10. The method of claim 9 wherein the fortified milk is acidified with citric acid.

11. The method of claim 1 wherein the temperature of the fortified milk during acidification is less than 35.degree. F. or greater than 100.degree. F.

12. The method of claim 1 wherein the fortified milk is acidified flowing through a conduit under turbulent conditions.

13. The method of claim 12 wherein the acid is introduced into the conduit at the region of turbulent flow.

14. A method of retaining added milk solids in a cheese making process, the method comprising:

acidifying milk containing additional milk solids down to a pH range of approximately 6.60 to 5.75 under turbulent conditions and then treating the acidified milk containing additional solids to form a cheese coagulum.

15. The method of claim 14 and further comprising pasteurizing the acidified milk.

16. The method of claim 14 wherein the milk containing the additional milk solids is pasteurized prior to acidification.

17. The method of claim 14 wherein the fortified milk is acidified in a region of turbulent flow.

18. The method of claim 14 wherein the milk is acidified to a pH range of approximately 6.5 to 6.1.

19. The method of claim 14 wherein the milk is acidified with an organic or inorganic acid, or acid producing bacteria.

* * * * *